(12) United States Patent
Huntwork et al.

(10) Patent No.: US 9,734,160 B1
(45) Date of Patent: Aug. 15, 2017

(54) VIRTUAL FILE SYSTEM FOR HOSTED NETWORK SITES

(75) Inventors: Andrew S. Huntwork, Seattle, WA (US); Prashant J. Thakare, Mercer Island, WA (US); Pravi Garg, Seattle, WA (US); Shashank Shekhar, Andhra Pradesh (IN); Gurinder Raju, Seattle, WA (US); Viraj Sanghvi, Seattle, WA (US); Vishnu Sadhana, Redmond, WA (US); Jeremy Boynes, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 13/348,081

(22) Filed: Jan. 11, 2012

(51) Int. Cl.
*G06F 17/30* (2006.01)
(52) U.S. Cl.
CPC .............................. *G06F 17/30233* (2013.01)
(58) Field of Classification Search
CPC ................................................. G06F 17/30233
USPC ....................................................... 707/695
See application file for complete search history.

(56) References Cited

U.S. PATENT DOCUMENTS

| | | | | |
|---|---|---|---|---|
| 5,848,415 A | * | 12/1998 | Guck | .............................. 707/831 |
| 6,356,863 B1 | * | 3/2002 | Sayle | ................ G06F 17/30235 |
| | | | | 703/27 |
| 6,470,345 B1 | * | 10/2002 | Doutre | .............. G06F 17/30067 |
| 7,774,754 B2 | * | 8/2010 | Komissarchik et al. | ...... 717/120 |
| 2006/0129627 A1 | * | 6/2006 | Phillips et al. | ................ 709/200 |
| 2007/0300220 A1 | * | 12/2007 | Seliger | ....................... G06F 8/61 |
| | | | | 718/1 |
| 2008/0098023 A1 | * | 4/2008 | Araki | ................. G06F 17/30233 |
| 2010/0235831 A1 | * | 9/2010 | Dittmer | ................ G06F 9/45558 |
| | | | | 718/1 |
| 2012/0265959 A1 | * | 10/2012 | Le | ...................... G06F 17/30067 |
| | | | | 711/162 |

\* cited by examiner

*Primary Examiner* — Boris Gorney
*Assistant Examiner* — Bao Tran
(74) *Attorney, Agent, or Firm* — Thomas | Horstmeyer, LLP (57) ABSTRACT

Disclosed are various embodiments relating to virtual file systems for customers having network sites hosted by a hosting provider. A file system with multiple files of a customer is maintained for a hosting provider. Customer access to a virtualized version of the file system is facilitated. The virtualized version of the file system includes a virtual file that is dynamically generated based at least in part on one of the files in response to an access of the virtual file by the customer. The file system excludes the virtual file. A modification to the virtual file by the customer is obtained. The file in the file system is updated based at least in part on the modification to the virtual file.

24 Claims, 7 Drawing Sheets

FIG. 1

Directory Listing for /home/customer23                                200

| Filename | File Size |
|---|---|
| banner.png | 20 KB |
| detailpage.class | 40 KB |
| detailpage.java | 128 KB |
| detailpage.jsp | 64 KB |
| detailpage.jsp-version2 | 63 KB |
| detailpage.jsp-version3 | 60 KB |
| detailpage.jsp-version4 | 54 KB |
| footer.html | 3 KB |
| internal-config.xml | 34 KB |

Welcome Customer 23! Directory listing for /                          220

| Filename | File Size | Compiled? | Multiple Versions? |
|---|---|---|---|
| banner.png | 20 KB | | |
| config.xml | 12 KB | | |
| detailpage.jsp | 64 KB | Yes | Yes (2, 3, 4) |
| footer.html | 3 KB | | |

VIRTUAL FILE SYSTEM FOR HOSTED NETWORK SITES

BACKGROUND

Network sites are often hosted for customers on shared server systems. The customers may be given varying levels of access to the shared server systems. For example, a customer may be given interactive login access via secure shell (SSH) or another approach. In other cases, a customer may be given access to a file system of the shared server system using file transfer protocol (FTP), secure FTP, and so on. In some cases, the customer may have no direct access to the shared server system and may have to send files to an email address or dropbox so that the files may be manually updated on the shared server system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing virtual file systems for customers of network site hosting providers. Merchants and other owners of network page sites may contract with hosting providers to generate and serve up their network sites. For example, a hosting provider may offer an end-to-end hosted electronic commerce platform that maintains an item catalog, generates detail pages for items, facilitates searching for items, facilitates browsing for items by way of a taxonomy or by way of suggested items, allows for customer reviews of items, and so on. Such a hosted electronic commerce platform may include functionality relating to shopping carts, order placement, order management and fulfillment, and/or other functionality. Such a platform offers merchants many advantages over self-managed solutions.

Merchants may wish to retain stylistic and content control over their online presence, even if it leverages an end-to-end hosted electronic platform. However, the hosting provider may be reluctant to grant the merchant access to execute arbitrary page generation code due to security concerns and compliance requirements for Payment Card Industry Data Security Standards (PCI DSS) and/or other security standards. Various embodiments of the present disclosure facilitate customer control over network page generation with a hosted network site. As used herein, the term "customer" may also include developers acting on behalf of customers of the hosting provider.

Network sites are often linked to a file system, such as a directory of a mounted file system, a network file system, and so on. An access to a uniform resource locator (URL) of the network site prompts transfer and/or generation of content using data of the linked file system. For various reasons, it may be undesirable to provide direct access to customers for files associated with their hosted network sites. As a non-limiting example, a configuration file may include information and settings for internal use by the hosting provider and other systems to which customers do not have direct access. Direct customer access to the configuration file would likely confuse the customer and could be a security risk. Furthermore, a file system associated with a customer network site may include files to which the customer should not have any access, multiple internal versions of files, files including portions that should not be modifiable by customers, and/or other potential issues relating to security or customer confusion.

Various embodiments of the present disclosure present virtual file systems to hosting customers instead of the actual file systems associated with the customers. The virtual file systems may be equipped to hide files or portions of files from the customers and transform files from one format to another. The virtual file systems may include virtual files (i.e., files that do not exist in the actual file system) that are dynamically generated in response to customer accesses. The virtual file systems may hide multiple versions of files to avoid confusing customers, and the virtual file systems may also be configured to automatically compile files where appropriate. In the following discussion, a general description of the system and its components is provided, followed by a discussion of the operation of the same.

Figure 1:
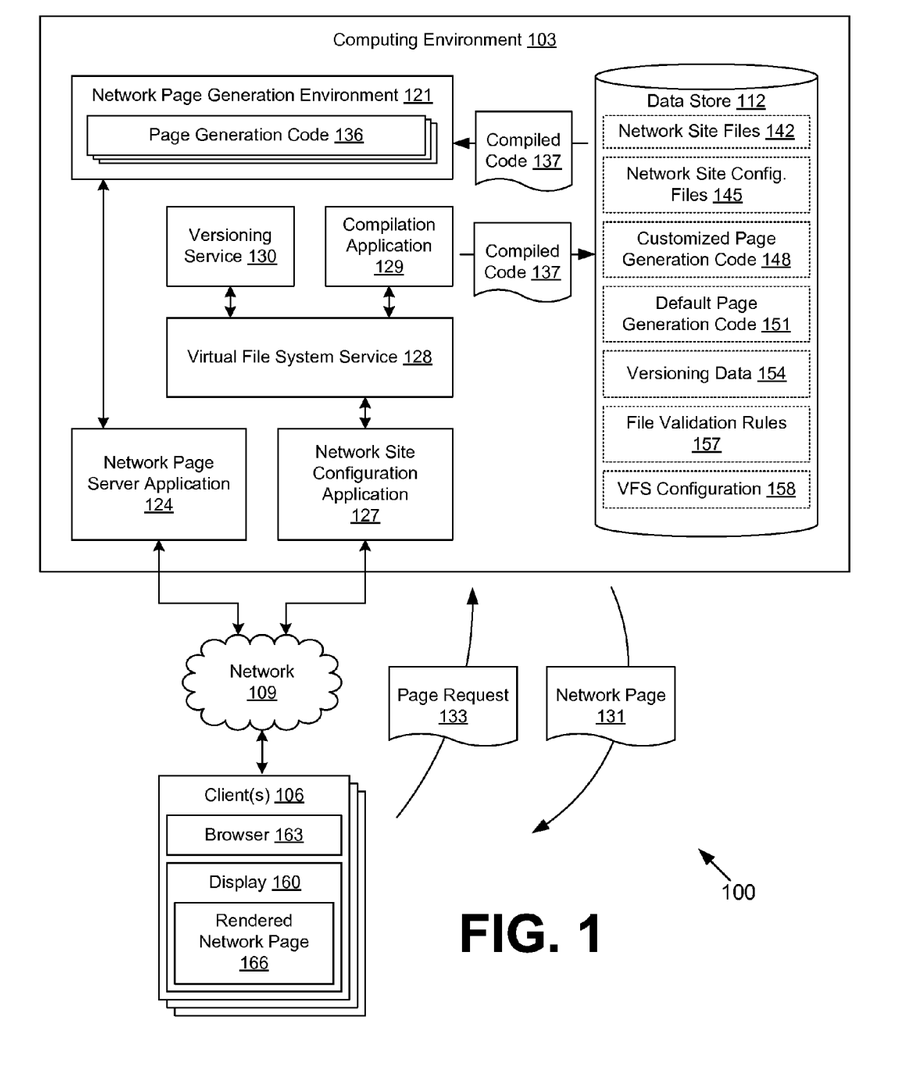
FIG. 1 is a drawing of a networked environment according to various embodiments of the present disclosure.

With reference to FIG. 1, shown is a networked environment 100 according to various embodiments relating to customer-supplied page generation code. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below. The data stores 112 may include mounted drives, network file systems, cloud storage systems, and so on, which correspond to actual file systems associated or linked with customer network sites. Where a cloud storage system is employed, it is understood that an actual file system may correspond to a storage "bucket" that is used to store and obtain data from the cloud storage system.

The components executed by the computing environment 103, for example, include a network page generation environment 121, a network page server application 124, a network site configuration application 127, a virtual file system service 128, a compilation application 129, a versioning service 130, and other applications, services, processes, systems, engines, or functionality not discussed in detail herein. The network page generation environment 121 is executed to generate the network pages 131 in response to page requests 133 obtained from clients 106. The network pages 131 may correspond to web pages, gopher pages, mobile application screens, and/or other forms of network content. Where the customer is a merchant, the network pages 131 may correspond to home pages, catalog pages, item detail pages, shopping cart pages, checkout pages, order confirmation pages, and so on. Such network pages 131 may facilitate selecting items for purchase, rental, download, lease, or other form of consumption. In addition, where the customer is a merchant, the network page generation environment 121 may include, or be in communication with, an electronic commerce system that performs various backend functions in order to facilitate the online purchase of items.

The network page generation environment 121 may execute page generation code 136 in order to generate the network pages 131. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation environment 121.

To this end, the network page generation environment 121 may include a Java Virtual Machine (JVM) and a servlet container such as Apache® Tomcat® or another servlet container. The network page generation environment 121 may be configured to obtain and provide aggregated data to the page generation code 136, for example, as a set of predefined implicit variables or by another approach. The network page generation environment 121 may act as a "sandbox" for the page generation code 136 to enforce restrictions on application programming interface (API) calls, access to the data source 115, and/or other resources in the computing environment 103. As a non-limiting example, where the network page generation environment 121 includes a JVM, a security manager may be installed in the JVM to deny access by the page generation code 136 to system data, data of other customers, and so on.

The network page server application 124 is configured to obtain the page requests 133 from the client 106 over the network 109, to generate network pages 131 in response to the page requests 133 using the network page generation environment 121, and to return the network pages 131 to the client 106 by way of the network 109. The network page server application 124 may also serve up other files and resources in response to requests over the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers. The network site configuration application 127 may include various components and/or may invoke various components of the network page generation environment 121 to enforce compile-time restrictions on the page generation code 136.

The virtual file system service 128 is configured to facilitate access to a virtualized version of an actual file system that is linked to the network site of a customer. That is to say, the virtualized version of the file system does not exist on a disk or other data store 112. In some cases, files present in the actual file system may be directly accessible through the virtualized version of the file system. In other cases, files present in the actual file system may be inaccessible or only accessible in part through the virtualized version of the file system. A file having a particular file name in the actual file system may have a different file name in the virtualized version of the file system.

Also, the virtual file system service 128 may be configured to transform a file stored in the actual file system into a different format for a corresponding file in the virtualized version of the file system. Such a transformation may be executed in response to the customer accessing the file in the virtualized version of the file system. Accordingly, such a file may be regarded as a "virtual file," which may not exist in the actual file system. Virtual files may be dynamically generated by the virtual file system service 128 based at least in part on one or more files in the actual file system. In some cases, the transformation may include encryption or decryption of the actual file.

The virtual file system service 128 may also be configured to provide versioning support and/or automatic compilation when desired. To this end, the virtual file system service 128 and/or the network site configuration application 127 may be configured to execute the compilation application 129 to compile code into an intermediate and/or executable format, and/or to execute the versioning service 130 to provide versioning support for the file system. The compiled code 137 generated by the compilation application 129 may be stored in the data store 112 or in some other storage location. The network page generation environment 121 is configured to obtain this compiled code 137 from the storage location and execute it as the page generation code 136.

Even though object code files and/or multiple versions of files may be created in the actual file system, the virtual file system service 128 may be configured to hide such files from the customer in the virtualized version of the file system. As a non-limiting example, the virtual file system service 128 may indicate that a source code file has a compiled version available, but may not list the compiled version as a separate file in the virtualized version of the file system. Similarly, the virtual file system service 128 may indicate that a particular file has multiple versions available and may enable selection of a particular one of the versions, but may not list the multiple versions as separate files in the virtualized version of the file system. Also, in one embodiment, multiple files may be versioned together so that a group of files is associated with a particular version.

The data stored in the data store 112 includes, for example, network site files 142, network site configuration files 145, customized page generation code 148, default page generation code 151, versioning data 154, file validation rules 157, virtual file system configuration 158, and potentially other data. The network site files 142 corresponds to files and other data used in the generation of the network pages 131 for the hosted network sites of the merchants or other customers. The network site files 142 may also correspond to other network resources besides network pages 131. Such files may include, for example, templates, hypertext markup language (HTML), text, extensible markup language (XML), cascading style sheets (CSS), images, audio, video, animations, and/or other data.

The network site configuration files 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 131 having, for example, a default appearance and behavior for a generic electronic commerce site.

The versioning data 154 may be used to track changes and modifications between multiple versions of files. The file validation rules 157 may configure various restrictions to be placed on the page generation code 136 by the network page generation environment 121. As a non-limiting example, where the page generation code 136 corresponds to JSP code, the network page generation environment 121 may restrict the JSP code from including scriptlets and/or various API calls. Various functionalities may be whitelisted or blacklisted, as the case may be. The file validation rules 157 may also be used to validate network site configuration files 145. The file validation rules 157 may also configure restrictions on writing to certain files or portions of files.

The virtual file system configuration 158 includes data that configures the generation of the virtualized version of the file system by the virtual file system service 128. Such configuration may control filename mapping, file transformations, which files are inaccessible or accessible, which files may be deleted, which files may not be deleted, and so on. The virtual file system configuration 158 may also control dynamic generation of various virtual files in the virtualized version of the file system which do not exist in the actual file system.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 131 served up by the computing environment 103 and/or other servers, thereby generating a rendered network page 166 on the display 160. The client 106, when controlled by a hosting customer, may include applications that interact with the network site configuration application 127 to facilitate control of the network site. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 131 accessible through the network site. Alternatively, or additionally, the merchant or other customer may create customized page generation code 148 for generating some or all of the network pages 131 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 131 for their network sites, despite using a hosted infrastructure and potentially a hosted electronic commerce platform.

When a customer uploads or edits page generation code 136, the network site configuration application 127 and/or other applications may perform various verifications on the static code. Such verifications may be referred to as compile-time checks, but need not occur at the same time the page generation code 136 is compiled, and in some cases, the page generation code 136 may be interpreted rather than compiled. Such verifications may be performed as configured by the file validation rules 157.

The network site configuration application 127 facilitates customer interaction with a virtualized version of the actual file system to create or edit files. To this end, the network site configuration application 127 obtains file listings and submits file modifications through the virtual file system service 128. The virtual file system service 128 may perform various transformations on actual files and/or obtain other data in order to provide or modify a file for the virtualized version of the file system. As a non-limiting example, the virtual file system service 128 may transform one XML document into another XML document using extensible stylesheet language transformations (XSLT), XPath, and/or other technologies.

In some cases, the file in the virtualized version of the file system may not actually exist in the file system. In such cases, the file may be termed a virtual file and may be dynamically generated upon access. The virtual file may include some portions of one or more actual files but exclude other portions. The included data may be transformed from one format to another. Such transformations may be performed to hide unnecessary or confusing information from the customer, to make the file more readable, and/or for other purposes. When the customer edits or modifies the virtual file, the modifications may be merged with the underlying actual files. File modifications, including file creations, may be assessed against file validation rules 157 by the virtual file system service 128 to ensure compliance.

In some embodiments, a virtual file may be created by the customer only by copying one virtual file into another virtual file. Through this process, metadata that is associated with the virtual file may be automatically stored in association with the other virtual file. This metadata configures the dynamic generation of the other virtual file in the same way as the virtual file and may similarly be subject to customer modifications.

Version control may be provided by the versioning service 130, and automatic compilation may be provided by the compilation application 129. With respect to versions, other versions of the file in the actual file system may be excluded from the virtualized version of the file system, thereby making them inaccessible to the user. Such versions may include compiled or other intermediate versions of code. Compilation of code may be automatic such that when a new source code file is uploaded or an existing file is modified, automatic compilation by the compilation application 129 may be triggered. In some embodiments, verbose output of the compilation application 129 may be provided to the customer through the network site configuration application 127 upon any compilation errors.

With respect to operation of the network site, the client 106 sends a page request 133 to the network page server application 124 for some network page 131 from the network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation environment 121.

The page generation code 136 for the requested network page 131 is executed by the network page generation environment 121. The network page generation environment 121 facilitates access to various data by the page generation code 136. The page generation code 136 generates the network page 131, and the network page server application 124 serves up the network page 131 to the client 106 in response to the page request 133.

Figure 2A:
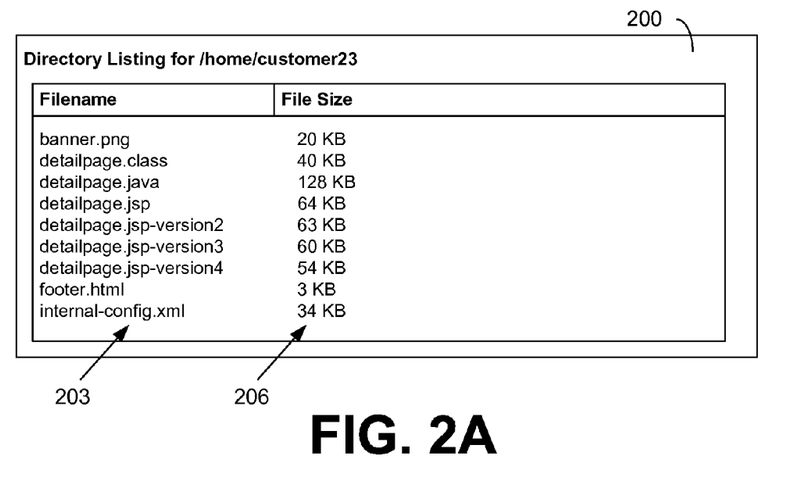
FIGS. 2A and 2B are drawings of examples of user interfaces rendered by a client in the networked environment of FIG. 1 according to various embodiments of the present disclosure.

Turning now to FIG. 2A, shown is one example of a user interface 200 rendered by a client 106 (FIG. 1) showing a directory listing for an actual file system of a customer according to one embodiment. In some cases, access to the listing in the user interface 200 may be limited to users authorized specially by the hosting provider. The listing includes filenames 203 and file sizes 206.

Figure 2B:
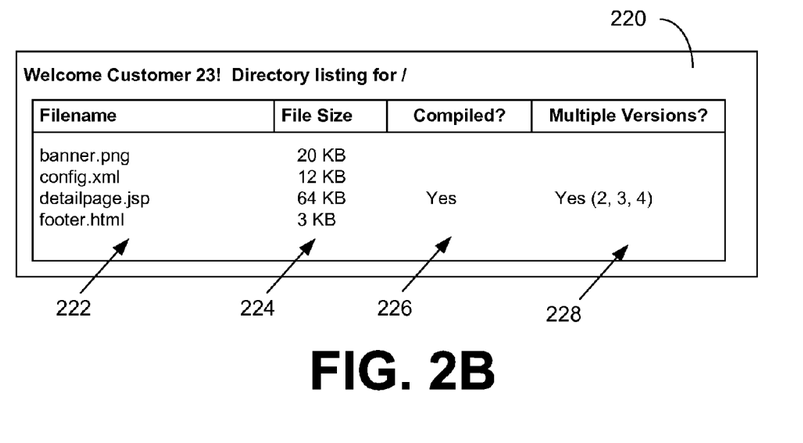

Moving on to FIG. 2B, shown is one example of a user interface 220 rendered by a client 106 (FIG. 1) showing a directory listing for a virtualized version of the file system of a customer according to one embodiment. In particular, the example in FIG. 2B relates to a virtualized version of the file system depicted in FIG. 2A. The listing includes filenames 222, file sizes 224, compilation indications 226, and version indications 228.

Referring now to both FIGS. 2A and 2B, it is noted that the filenames 222 exclude certain entries from the filenames 203. In particular, "detailpage.class" and "detailpage.java" may be excluded from the virtualized version of the file system because they represent compiled or intermediate forms of source files. "detailpage.jsp-version2," "detailpage.jsp-version3," and "detailpage.jsp-version4" may be excluded as corresponding to multiple versions of "detailpage.jsp."

The file "internal-config.xml" may be excluded from the virtualized version of the file system for security or relevancy reasons. The file "config.xml" may correspond to a virtual file which is generated based at least in part on one or more actual files, such as "internal-config.xml." In one scenario, "internal-config.xml" may be transformed into "config.xml" upon an access. Some files ("banner.png," "detailpage.jsp," and "footer.html") may be included in both the actual file system and the virtualized version. The compilation indications 226 and version indications 228 may be present to provide the information regarding versioning and compilation status that may be otherwise absent in the virtualized version of the file system. In some embodiments, user interface components may be provided to trigger compilation or to create new versions.

Figure 3:
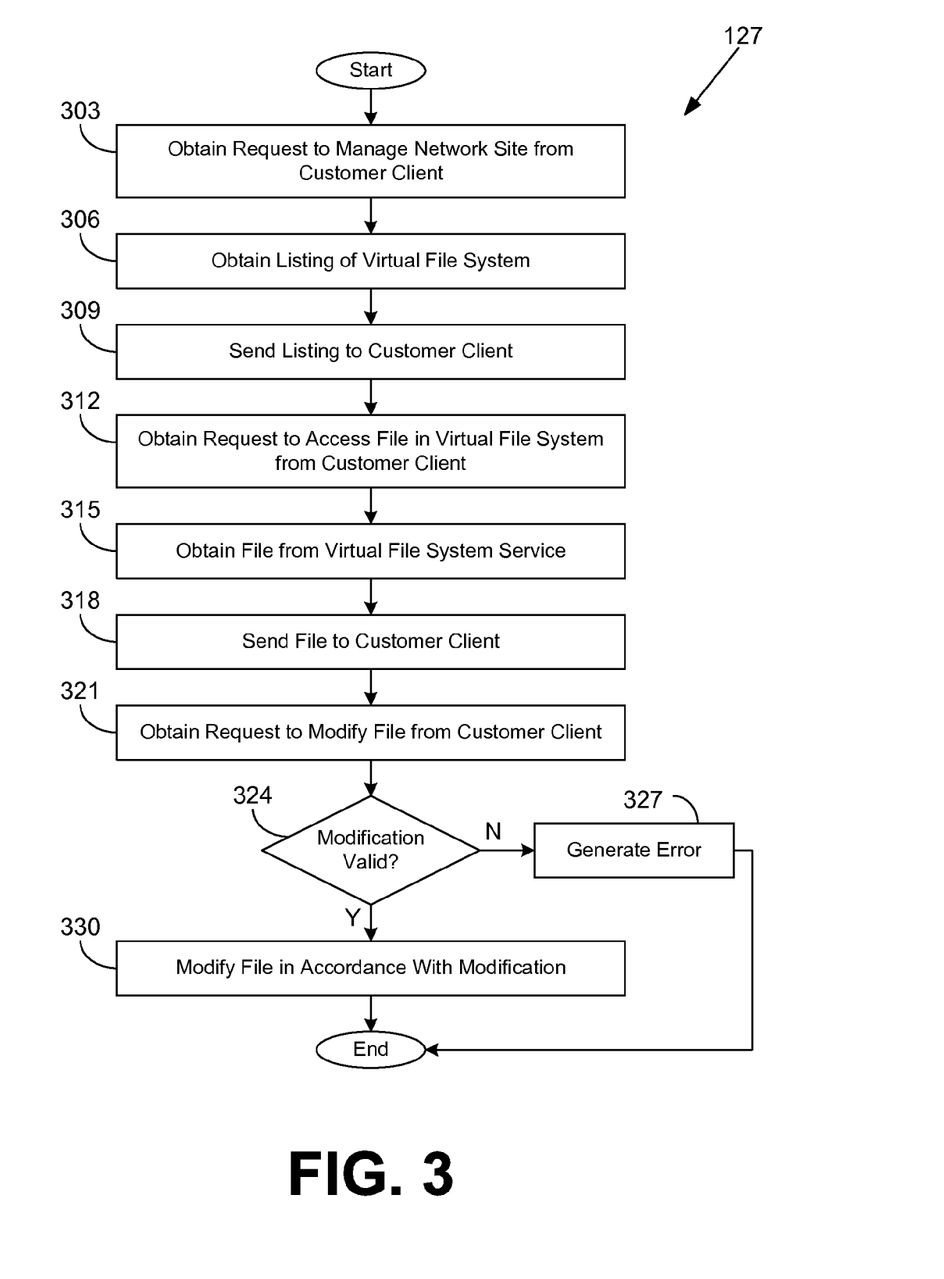
FIG. 3 is a flowchart illustrating one example of functionality implemented as portions of a network site configuration application executed in a computing environment in the networked environment of FIG. 1 according to various embodiments of the present disclosure.

Referring next to FIG. 3, shown is a flowchart that provides one example of the operation of a portion of the network site configuration application 127 according to various embodiments. It is understood that the flowchart of FIG. 3 provides merely an example of the many different types of functional arrangements that may be employed to implement the operation of the portion of the network site configuration application 127 as described herein. As an alternative, the flowchart of FIG. 3 may be viewed as depicting an example of steps of a method implemented in the computing environment 103 (FIG. 1) according to one or more embodiments.

Beginning with box 303, the network site configuration application 127 obtains a request from a customer client 106 (FIG. 1) to manage a network site of the customer. Various forms of authentication may be performed to control access to the network site configuration application 127, e.g., username/password, public key encryption, and so on. In box 306, the network site configuration application 127 obtains a listing of the virtualized version of the actual file system associated with the customer network site from the virtual file system service 128 (FIG. 1). The actual file system is stored by the data store 112. In box 309, the network site configuration application 127 returns the listing of files to the client 106.

In box 312, the network site configuration application 127 obtains a request from the client 106 to access a file in the virtualized version of the file system. In box 315, the network site configuration application 127 obtains the file from the virtual file system service 128. It is noted that the file may be an actual file stored in the file system or a virtual file which is not stored in the file system. The file is then returned to the client 106 in box 318.

In box 321, the network site configuration application 127 obtains a request from the client 106 to modify a file in the virtualized version of the file system. In some cases, the file modification may correspond to creating a new file in the virtualized version of the file system. In box 324, the network site configuration application 127 determines whether the modification is valid, e.g., whether the customer has write access to make the modification, whether the proposed modification complies with one or more file validation rules 157 (FIG. 1), etc. In some cases, the validity may be evaluated at least in part by the virtual file system service 128.

If the modification is not valid, the network site configuration application 127 generates an error in box 327. Thereafter, the portion of the network site configuration application 127 ends. If the modification is valid, the network site configuration application 127 moves from box 324 to box 330 and modifies the file in accordance with the modification. The network site configuration application 127 may commit the file to the virtualized version of the file system in coordination with the virtual file system service 128. Thereafter, the portion of the network site configuration application 127 ends.

Figure 4A:
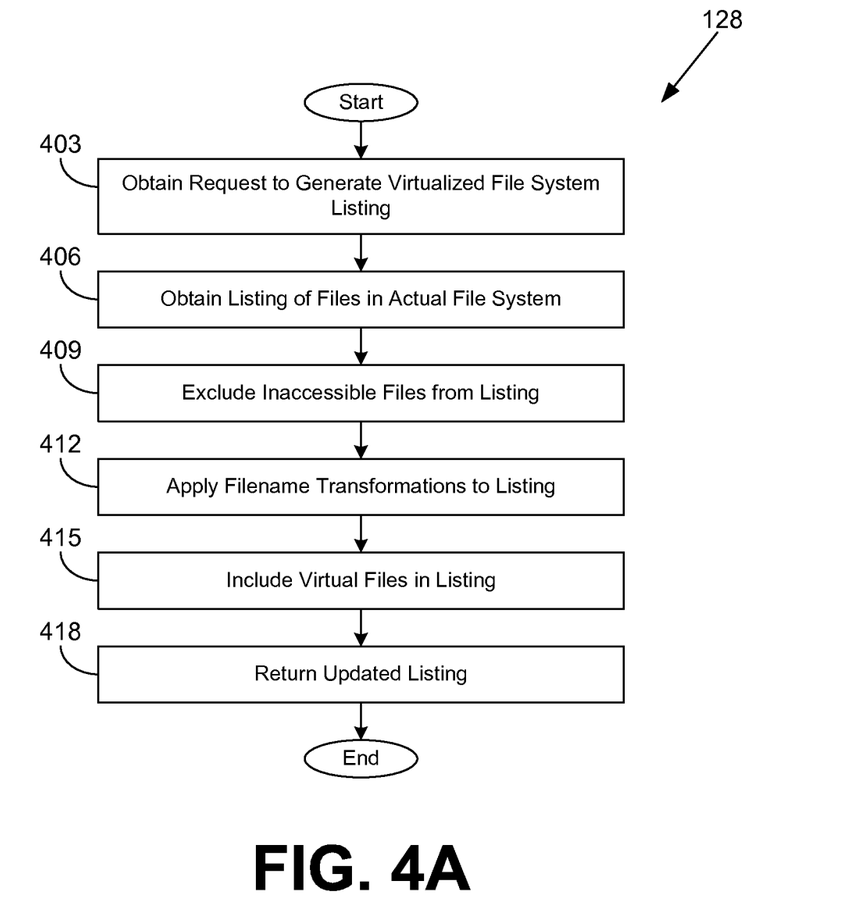
FIGS. 4A-4C are flowcharts illustrating examples of functionality implemented as portions of a virtual file system service executed in a computing environment in the networked environment of FIG. 1 according to various embodiments of the present disclosure.

Turning now to FIG. 4A, shown is a flowchart that provides one example of the operation of a portion of the virtual file system service 128 according to various embodiments. In particular, FIG. 4A relates to generating a file listing for a virtualized version of a file system. It is understood that the flowchart of FIG. 4A provides merely an example of the many different types of functional arrangements that may be employed to implement the operation of the portion of the virtual file system service 128 as described herein. As an alternative, the flowchart of FIG. 4A may be viewed as depicting an example of steps of a method implemented in the computing environment 103 (FIG. 1) according to one or more embodiments.

Beginning with box 403, the virtual file system service 128 obtains a request to generate a listing for a virtualized version of a file system. In box 406, the virtual file system service 128 obtains a listing of files in the actual file system associated with the virtualized version. Such files may include, for example, network site files 142 (FIG. 1), network site configuration files 145 (FIG. 1), customized page generation code 148 (FIG. 1), default page generation code 151 (FIG. 1), and/or other data from the data store 112 (FIG. 1).

In box 409, the virtual file system service 128 excludes any inaccessible files from the listing according to the virtual file system configuration 158 (FIG. 1). Files may be inaccessible because the customer is not to have direct access, because their presence would be confusing or would impair usability, or for other reasons. In box 412, the virtual file system service 128 applies transformations, if applicable, to filenames and/or other data in the listing. As a non-limiting example, an internal name may be renamed to an external name.

In box 415, the virtual file system service 128 includes virtual files in the listing. Virtual files may correspond to files not present in the actual file system which may be dynamically generated by the virtual file system service 128. In box 418, the virtual file system service 128 returns the updated listing as the listing for the virtualized version of the file system. Thereafter, the portion of the virtual file system service 128 ends.

Figure 4B:
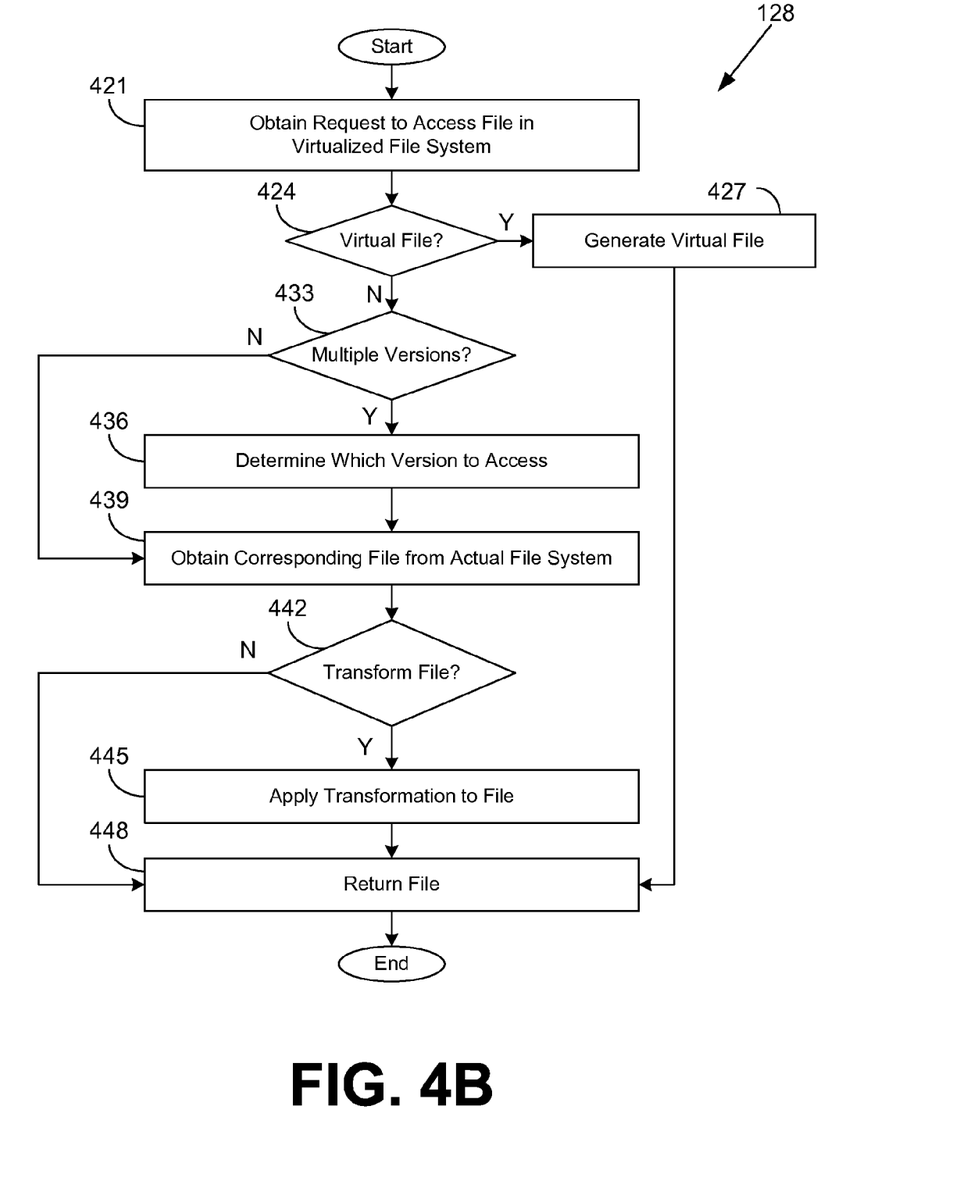

Moving on to FIG. 4B, shown is a flowchart that provides one example of the operation of another portion of the virtual file system service 128 according to various embodiments. In particular, FIG. 4B relates to accessing a file from a virtualized version of a file system. It is understood that the flowchart of FIG. 4B provides merely an example of the many different types of functional arrangements that may be employed to implement the operation of the portion of the virtual file system service 128 as described herein. As an alternative, the flowchart of FIG. 4B may be viewed as depicting an example of steps of a method implemented in the computing environment 103 (FIG. 1) according to one or more embodiments.

Beginning with box 421, the virtual file system service 128 obtains a request to access a file in a virtualized version of a file system. As an example, the request may identify the file by a file name obtained in a listing generated as described in connection with the flowchart of FIG. 4A. As another example, the request may simply specify a uniform resource locator (URL) or other unique identifier. In box 424, the virtual file system service 128 determines whether the requested file is a virtual file. If the requested file is a virtual file, the virtual file system service 128 generates the virtual file in box 427. The virtual file may be generated based at least in part on one or multiple files in the actual file system, a database query result, and/or other data. The virtual file system service 128 proceeds to box 430.

If the requested file is not a virtual file, the virtual file system service 128 proceeds instead from box 424 to box 433. In box 433, the virtual file system service 128 determines whether the requested file is associated with multiple versions in the actual file system. If the requested file is associated with multiple versions in the actual file system, the virtual file system service 128 determines which version to access in box 436. The virtual file system service 128 then proceeds to box 439. If the requested file is not associated with multiple versions in the actual file system, the virtual file system service 128 transitions from box 433 to box 439.

In box 439, the virtual file system service 128 obtains the corresponding file from the actual file system. In box 442, the virtual file system service 128 determines whether the file is to be transformed from one format to another. If the file is to be transformed from one format to another, the virtual file system service 128 applies the transformation to the file in box 445. In some situations, multiple transformations may be applied to the file. The virtual file system service 128 then continues to box 448. If no transformation is to be applied, the virtual file system service 128 moves from box 442 to box 448. In box 448, the virtual file system service 128 returns the file. Thereafter, the portion of the virtual file system service 128 ends.

Figure 4C:
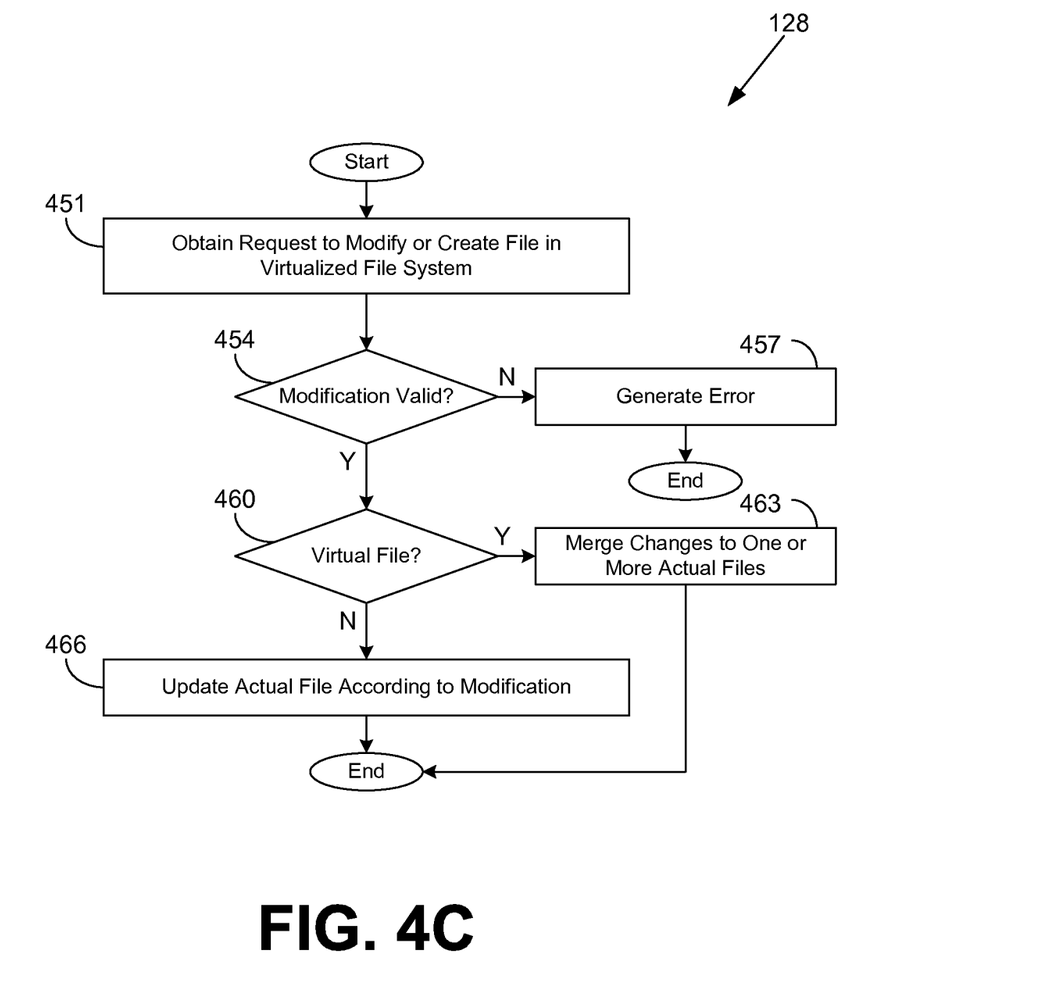

Continuing on to FIG. 4C, shown is a flowchart that provides one example of the operation of yet another portion of the virtual file system service 128 according to various embodiments. In particular, FIG. 4C relates to modifying or creating a file in a virtualized version of a file system. It is understood that the flowchart of FIG. 4C provides merely an example of the many different types of functional arrangements that may be employed to implement the operation of the portion of the virtual file system service 128 as described herein. As an alternative, the flowchart of FIG. 4C may be viewed as depicting an example of steps of a method implemented in the computing environment 103 (FIG. 1) according to one or more embodiments.

Beginning with box 451, the virtual file system service 128 obtains a request to modify or create a file in a virtualized version of a file system. In box 454, the virtual file system service 128 determines whether the modification is valid. To this end, various file validation rules 157 may be applied. For example, for creation of a virtual file, it may be necessary that an existing virtual file be copied into the new virtual file in order to provide metadata for the file. Also, some files may be read only or have portions that are read only. Additionally, modifications to customized page generation code 148 (FIG. 1) may be evaluated to ensure, for example, that restricted system calls, service calls, scriptlets, etc. are not included. Further, some inaccessible files in the actual file system may conflict with the creation or modification of a file in the virtualized version of the file system.

If the modification is not valid, the virtual file system service 128 generates an error in box 457. Thereafter, the portion of the virtual file system service 128 ends. If the modification is valid, the virtual file system service 128 transitions from box 454 to box 460. In box 460, the virtual file system service 128 determines whether the modification corresponds to a virtual file. If the modification corresponds to a virtual file, the virtual file system service 128 merges the changes from the modification to one or more actual files in the file system. In some cases, the virtual file system service 128 may update data stored in a database, where the data is used in generating the virtual file. Thereafter, the portion of the virtual file system service 128 ends.

If the modification does not relate to a virtual file, the virtual file system service 128 moves from box 460 to box 466. In box 466, the virtual file system service 128 updates a corresponding file in the actual file system according to the modification. The virtual file system service 128 may create the file if it is not already present. If the file corresponds to customized page generation code 148 or other code, the virtual file system service 128 may be configured to compile the code using the compilation application 129. If the file corresponds to a new or modified file version, the virtual file system service 128 may be configured to update corresponding versioning data 154 (FIG. 1) via the versioning service 130 (FIG. 1). Thereafter, the portion of the virtual file system service 128 ends.

Figure 5:
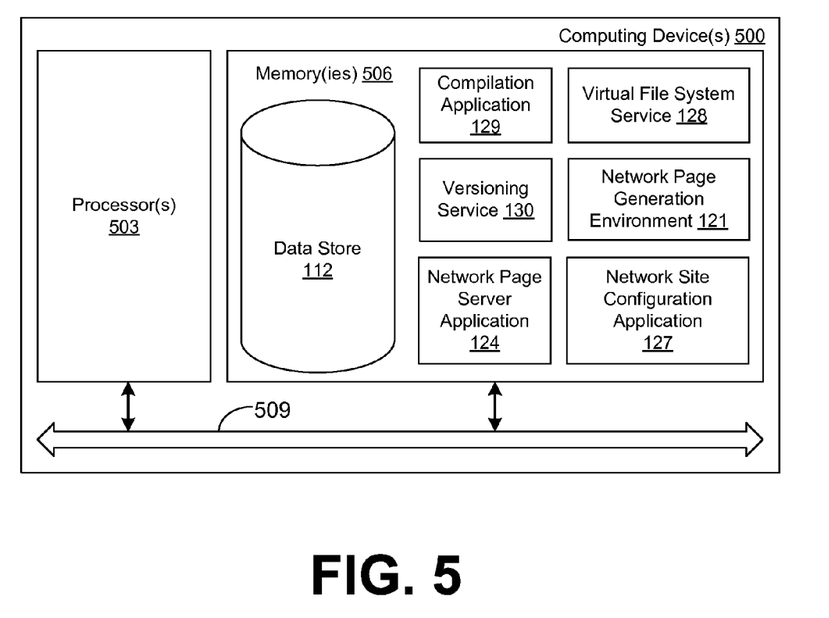
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 500 according to an embodiment of the present disclosure. The computing device 500 corresponds to a representative computing device which may be employed in the computing environment 103 (FIG. 1). The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network page generation environment 121, the network page server application 124, the network site configuration application 127, the virtual file system service 128, the compilation application 129, the versioning service 130, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network page generation environment 121, the network page server application 124, the network site configuration application 127, the virtual file system service 128, the compilation application 129, the versioning service 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4C show the functionality and operation of an implementation of portions of the network site configuration application 127 and the virtual file system service 128. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4C show a specific order of execution, it is understood that the order of execution may differ from that which is depicted. For example, the order of execution of two or more blocks may be scrambled relative to the order shown. Also, two or more blocks shown in succession in FIGS. 3-4C may be executed concurrently or with partial concurrence. Further, in some embodiments, one or more of the blocks shown in FIGS. 3-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation environment 121, the network page server application 124, and the network site configuration application 127, the virtual file system service 128, the compilation application 129, and the versioning service 130, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one server computing device that when executed causes the at least one server computing device to at least:

maintain a file system of the at least one server computing device for a hosting provider, the file system including a plurality of files associated with a user of the hosting provider;

facilitate access by a client computing device of the user to a virtualized version of the file system of the at least one server computing device by way of a web-based distributed authoring and versioning (WebDAV) protocol, the virtualized version of the file system including a virtual file, content of the virtual file being dynamically generated to include at least portions of multiple actual files of the file system;

determine whether a request for a file in the virtualized version of the file system from the client computing device of the user corresponds to the virtual file;

determine whether a plurality of versions of the file exist in the virtualized version of the file system in response to a first determination that the request for the file does not correspond to the virtual file;

identify at least one of the plurality of versions of the file in response to a second determination that the plurality of versions of the file exist;

provide the at least one of the plurality of versions of the file to the client computing device of the user;

generate the virtual file in response to a third determination that the request for the file corresponds to the virtual file by transforming one of the multiple actual files embodied in a first format to a second format, wherein the virtual file is embodied in the second format and the content of the virtual file combines the portions of the multiple actual files in response to an access to the virtual file by the client computing device of the user;

provide the generated virtual file to the client computing device of the user;

obtain a modification to the generated virtual file from the client computing device of the user;

determine that the modification complies with a file validation rule; and merge the modification into at least one of the multiple actual files in response to a fourth determination that the modification complies with the file validation rule.

2. The non-transitory computer-readable medium of claim 1, wherein a first portion of the virtual file is designated read-only for the user and a second portion of the virtual file is designated writeable for the user, and causing the at least one server computing device to merge the modification further comprises causing the at least one server computing device to verify that the first portion of the virtual file is unmodified by the modification.

3. A system, comprising:
at least one server computing device; and
at least one application executable in the at least one server computing device, the at least one application comprising machine readable instructions that, when executed, cause the at least one server computing device to at least:
maintain a file system of the at least one server computing device for a hosting provider, the file system including a plurality of files associated with a user of the hosting provider;
facilitate access by a client computing device of the user to a virtualized version of the file system of the at least one server computing device, the virtualized version of the file system including a virtual file, content of the virtual file being dynamically generated to include at least portions of multiple actual files of the file system, wherein the virtual file is generated at least in part by transforming at least one of the multiple actual files embodied in a first format to a second format and the content of the virtual file combines the portions of the multiple actual files, wherein the virtual file is generated in response to an access of the virtual file by the client computing device of the user, such that the virtual file is expressed in the second format;
obtain a modification to the virtual file from the client computing device of the user;
determine that the modification to the virtual file complies with at least one file validation rule; and
update at least one of the multiple actual files in the first format based at least in part on the modification to the virtual file.

4. The system of claim 3, wherein the at least one of the multiple actual files corresponds to a first extensible markup language (XML) document, and the virtual file corresponds to a second XML document.

5. The system of claim 3, wherein the at least one application further comprises machine readable instructions that, when executed, cause the at least one server computing device to at least
generate an error in response to a determination that the modification to the virtual file does not comply with the at least one file validation rule established by the hosting provider.

6. The system of claim 3, wherein one or more of the plurality of files corresponds to network page generation code configured to generate at least one network page for a network site of the user hosted by the hosting provider, and the at least one application further comprises machine readable instructions that, when executed, cause the at least one server computing device to at least:
obtain a request for the at least one network page from the client computing device;
generate the at least one network page based at least in part on the network page generation code in response to the request; and
send the at least one network page to the client computing device.

7. The system of claim 3, wherein the virtualized version of the file system excludes one of the plurality of files.

8. The system of claim 3, wherein the virtualized version of the file system includes one of the plurality of files.

9. The system of claim 3, wherein causing the at least one server computing device to facilitate access to the virtualized version of the file system further comprises:
causing the at least one server computing device to restrict editing by the user of a first portion of one of the plurality of files; and
causing the at least one server computing device to allow editing by the user of a second portion of the one of the plurality of files.

10. The system of claim 3, wherein the virtual file excludes a first portion of one of the multiple actual files, and the virtual file includes a second portion of the one of the multiple actual files.

11. The system of claim 3, wherein the at least one of the multiple actual files is associated with a first filename in the file system, and the virtual file is associated with a second filename in the virtualized version of the file system which differs from the first filename.

12. The system of claim 3, wherein the file system includes a source code file and a compiled version of the source code file, and the virtualized version of the file system includes the source code file and excludes the compiled version of the source code file.

13. The system of claim 12, wherein the modification to the virtual file comprises a first modification and the at least one application further causes the at least one server computing device to at least automatically compile the source code file into the compiled version of the source code file in response to a second modification to the source code file by the client computing device of the user.

14. The system of claim 3, wherein causing the at least one server computing device to facilitate access by the client computing device of the user to the virtualized version of the file system further comprises causing the at least one server computing device to facilitate access by way of a web-based distributed authoring and versioning (WebDAV) protocol.

15. The system of claim 3, wherein the virtualized version of the file system includes another virtual file which is dynamically generated based at least in part on a database query result in response to another access of the other virtual file by the client computing device of the user.

16. The system of claim 3, wherein the virtualized version of the file system includes another virtual file which corresponds to a selected one of a plurality of versions of one of the plurality of files which are included in the file system.

17. The system of claim 3, wherein the virtual file is a decrypted version of the at least one of the multiple actual files.

18. The system of claim 3, wherein the at least one application further causes the at least one server computing device to facilitate copying of the virtual file into another virtual file in the virtualized version of the file system.

19. The system of claim 18, wherein causing the at least one server computing device to facilitate copying of the virtual file into another virtual file further comprises causing the at least one server computing device to automatically store metadata associated with the virtual file in association with the other virtual file.

20. A method, comprising:
maintaining, in at least one of one or more server computing devices, a file system for a hosting provider of the at least one of one or more server computing devices, the file system including a plurality of files associated with a user of the hosting provider;
facilitating access by a client computing device of the user, in the at least one of the one or more server computing devices, to a virtualized version of the file system of the at least one of one or more server computing devices including some of the plurality of files and excluding at least one of the plurality of files stored on the at least one of one or more server computing devices;

obtaining, in the at least one of the one or more server computing devices, a request by the client computing device of the user to access a file in the virtualized version of the file system;

determining whether the file in the virtualized version of the file system is represented as a virtual file that is not actually stored on the at least one of one or more server computing devices;

generating, in the at least one of the one or more server computing devices, the virtual file in response to determining that the file in the virtualized version of the file system is represented as a virtual file, content of the virtual file being dynamically generated to include at least portions of multiple actual files of the file system, wherein the virtual file is generated at least in part by transforming at least one of the plurality of files excluded from the virtualized version of the file system from a first format corresponding to the at least one of the plurality of files into a second format corresponding to the virtual file;

determining, in the at least one of the one or more server computing devices, whether a plurality of versions of the file are available to the virtualized version of the file system in response to determining that the file is not a virtual file;

identifying, in the at least one of the one or more server computing devices, at least one of the plurality of versions of the file to be accessed in response to determining that the plurality of versions of the file are available to the virtualized version of the file system;

obtaining, in the at least one of the one or more server computing devices, a modification to the virtual file from the client computing device of the user;

determining, in the at least one of the one or more server computing devices, that the modification to the virtual file complies with at least one file validation rule; and applying, in the at least one of the one or more server computing devices, the modification to at least one of the multiple actual files used in generating the virtual file in response to a determination that the modification to the virtual file complies with the at least one file validation rule.

21. The method of claim 20, wherein the first format comprises an extensible markup language (XML) document format.

22. The method of claim 20, wherein the file system includes a plurality of versions of one of the plurality of files, and the virtualized version of the file system includes at most one of the versions of the one of the plurality of files.

23. The method of claim 20, wherein the transforming further comprises decrypting the at least one file excluded from the virtualized version of the file system.

24. The method of claim 20, wherein access to the virtualized version of the file system is facilitated through a version of a web-based distributed authoring and versioning (WebDAV) protocol.

* * * * *